United States Patent
Korkishko et al.

(10) Patent No.: US 8,429,469 B2
(45) Date of Patent: Apr. 23, 2013

(54) METHOD AND APPARATUS FOR REMOTELY VERIFYING MEMORY INTEGRITY OF A DEVICE

(75) Inventors: Tymur Korkishko, Suwon-si (KR); Kyung-Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1190 days.

(21) Appl. No.: 11/593,520

(22) Filed: Nov. 7, 2006

(65) Prior Publication Data

US 2007/0150857 A1 Jun. 28, 2007

(30) Foreign Application Priority Data

Dec. 28, 2005 (KR) .................. 10-2005-0131582

(51) Int. Cl.
*G11C 29/38* (2006.01)
*G11C 29/54* (2006.01)

(52) U.S. Cl.
USPC .......................................... 714/719; 714/736

(58) Field of Classification Search .................. None
See application file for complete search history.

(56) References Cited

U.S. PATENT DOCUMENTS

| | | | | |
|---|---|---|---|---|
| 4,809,156 | A * | 2/1989 | Taber | 711/217 |
| 5,257,035 | A * | 10/1993 | Funahashi et al. | 347/139 |
| 5,493,665 | A * | 2/1996 | Eisenberg | 711/115 |
| 5,757,708 | A * | 5/1998 | Nakashima et al. | 365/203 |
| 5,881,221 | A * | 3/1999 | Hoang et al. | 714/42 |
| 6,862,652 | B1 * | 3/2005 | Tsuji | 711/103 |
| 6,925,566 | B1 * | 8/2005 | Feigen et al. | 713/187 |
| 2002/0116339 | A1 * | 8/2002 | Lin | 705/59 |
| 2004/0223011 | A1 * | 11/2004 | Adkins et al. | 347/7 |
| 2005/0017872 | A1 * | 1/2005 | Miyake | 340/825.72 |
| 2005/0194591 | A1 * | 9/2005 | Usami et al. | 257/48 |

* cited by examiner

*Primary Examiner* — Ajay Bhatia
*Assistant Examiner* — Dipakkumar Gandhi
(74) *Attorney, Agent, or Firm* — NSIP Law

(57) ABSTRACT

A device and method for verifying the integrity of a memory in a remote device are provided. An exemplary memory integrity verification method compares, based on a verification parameter received from a verifier, the time for retrieving data block of a memory of a remote device with a maximum threshold time allowed to read the memory, and transmits to the verifier a remote verification code and a data status according to the result of comparison so that the verifier can verify the integrity of the memory. Instead of relying on the verifier, the remote device provides data status information for integrity verification by using the memory retrieval time. As a result, accurate integrity verification is provided, and no independent hardware is required to verify integrity.

19 Claims, 3 Drawing Sheets

METHOD AND APPARATUS FOR REMOTELY VERIFYING MEMORY INTEGRITY OF A DEVICE

CROSS-REFERENCE TO RELATED APPLICATIONS

This application claims the benefit under 35 U.S.C. §119 (a) from Korean Patent Application No. 2005-131582, filed Dec. 28, 2005, in the Korean Intellectual Property Office, the entire disclosure of which is hereby incorporated by reference.

BACKGROUND OF THE INVENTION

1. Field of the Invention

The present invention relates to a method of verifying memory integrity of a remote device. More particularly, the present invention relates to a method and apparatus for verifying integrity of a remote device memory in which a data block of the memory is retrieved at a remote device based on verification parameters received from a verifier.

2. Description of the Related Art

FIG. 1 illustrates an integrity check of a remote device known in the prior art.

Referring to FIG. 1, remote network devices such as televisions (TV), set-top boxes, mobile phones, LAN-based or WAN-based personal computers (PCs) and small sensors are easy targets of hackers. Network hosts or service providers are sometimes unable to prevent the hackers from tampering with the above devices.

It is not easy for the network hosts or the service providers to physically check the remote devices and check whether an unauthorized user has accessed their software applications and tampered with the devices. Therefore, a memory integrity check in a network is required. The 'integrity' in the sense of a network security refers to the guarantee that only the authorized person is allowed to access or change the data provided by the network.

Conventionally, a digest value with respect to selected software, or hash values with respect to a memory area of the remote device have been used to check the integrity of a remote device.

In using the hash values, for example, first, hash values are generated by inserting a random seed in a memory area, and the random seed, hash function and information about the memory to check, are transmitted to the remote device. The remote device generates hash values of the memory area using the information received from the verifier, and sends the generated hash values to the verifier. The verifier checks the integrity of the memory area by comparing the hash values generated at the verifier with respect to the memory area on one hand, with the hash values generated at the remote device with respect to the memory area on the other hand.

This method, however, has the drawback of inaccuracy because the integrity check is skipped when malignant codes such as a virus change the location of the memory after attack.

Meanwhile, in using the digest values with respect to the selected software, digest values with respect to the software stored in the remote device are authenticated and stored in the memory. The software integrity is checked by comparing the authenticated digest values with digest values which are obtained by applying a separate hash function to the selected software. However, this method has a drawback in that it can be applied to the integrity check with respect to the software stored in the remote device only.

Accordingly, there is a need for an integrity check that is seamless against the location-shifting attacks of malignant codes and that enables an integrity check from outside of the remote device, not only in remote device booting but also at run-time.

SUMMARY OF THE INVENTION

It is an object of the present invention to resolve the above-mentioned problems and/or disadvantages occurring in the related art and provide at least the advantages described below. Therefore, an aspect of the present invention is to provide a method and apparatus for verifying the integrity of a remote device memory, according to which a data block of the memory is retrieved at the remote device based on verification parameters received from a verifier, and compared with a maximum threshold time allowed to read the memory, and a remote verification code and data status according to the result of the comparison are sent to the verifier to verify the integrity of the memory.

In order to achieve the above objects, exemplary embodiments of the present invention provide a remote device, which comprises a memory, a generator which generates a remote verification code using a verification parameter which is received from a verifier, the verifier providing the verification parameter for integrity verification of the memory, a read proxy which retrieves data from the memory using the verification parameter and generates a status value according to a difference between a time of retrieving a first address from the memory and a time of finishing retrieval of the last data of the memory, an integrity verifier which provides the read proxy with the verification parameter (for integrity verification of the memory) and a controller which controls the device such that the remote verification code and the status value are transmitted to the verifier.

An exemplary verification parameter comprises a memory filling map and a random number sequence.

An exemplary memory retrieval by the read proxy comprises filling in empty areas of the memory with a random number according to the memory filling map, and reading in reverse order the contents of the fully filled memory.

An exemplary integrity verifier provides the generator with a message authentication code (MAC) generating function, and the generator generates the remote verification code using the MAC generating function.

An exemplary read proxy transmits the status value of "Failed" to the integrity verifier when the time difference is larger than a threshold time allowed to read the memory, and transmits the status value of "Success" to the integrity verifier when the time difference is not larger than the threshold time.

According to an exemplary aspect of the present invention, an apparatus for verifying integrity of a memory of a remote device, is provided, comprising a random number generator which, using a random number function, generates a random number for use in verifying the integrity of the memory, a storage which stores the random number function for use at the random number generator, a memory filling map which comprises information about the filling in of the random number in an empty area of the memory, and a message authentication code (MAC) generating function for use in generating a local verification code, an analyzer which generates the local verification code using the MAC generating function, and compares the generated local verification code with a remote verification code received from the remote device, a controller which sends out the random number and the memory filling map and an integrity verifier to the remote device, receives the remote verification code and a data status value from the remote device, and determines the integrity of the memory of the remote device based on the data status value and the result of comparison by the analyzer between the local verification code with the remote verification code.

An exemplary data status value comprises a result of comparing a time difference with a threshold time, the time difference being obtained between a time of starting data retrieval of the memory and a time of finishing the retrieval of the last data of the memory.

An exemplary data status value of "Failed" is received from the remote device when the time difference is larger than the threshold time, and the data status value of "Success" is received from the remote device when the time difference is not larger than the threshold time.

When the data status value is "Success", the local verification code is compared with the remote verification code, and if, as a result of the comparison, the local verification code is identical with the remote verification code, the integrity verification is determined to be successful, and if not, the integrity verification is determined to be failed, while, when the data status value is "Failed", the integrity verification is determined to be failed.

An exemplary method for checking integrity of a remote device comprises receiving from a verifier a verification parameter, the verifier providing the verification parameter and an integrity verifier for integrity verification of a memory, performing a data retrieval of the memory based on the verification parameter, obtaining a data status value by comparing a time difference with a threshold time, the time difference being obtained as a result of comparing a time of starting the data retrieval of the memory with a time of finishing the data retrieval and generating a remote verification code and sending it together with the data status value to the verifier.

An exemplary verification parameter comprises a memory filling map and a random number.

An exemplary data retrieval of the memory based on the check parameter comprises filling in an empty area of the memory with a random number according to a memory filling map and reading the contents of the full memory in a reverse order.

In the obtaining a data status value by comparing a time difference with a threshold time, the data status value may be set to "Failed" when the time difference is larger than the threshold time, and may be set to "Success" when the time difference is not larger than the threshold time.

In the generating and sending the remote check code together with the data status value to the verifier, the remote verification code may be generated by using a message authentication code (MAC) generating function which is received from the verifier.

BRIEF DESCRIPTION OF THE DRAWING FIGURES

These and/or other aspects and advantages of the present general inventive concept will become apparent and more readily appreciated from the following description of exemplary embodiments, taken in conjunction with the accompanying drawings of which:

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Reference will now be made in detail to exemplary embodiments of the present invention which are illustrated in the accompanying drawings.

Figure 1:
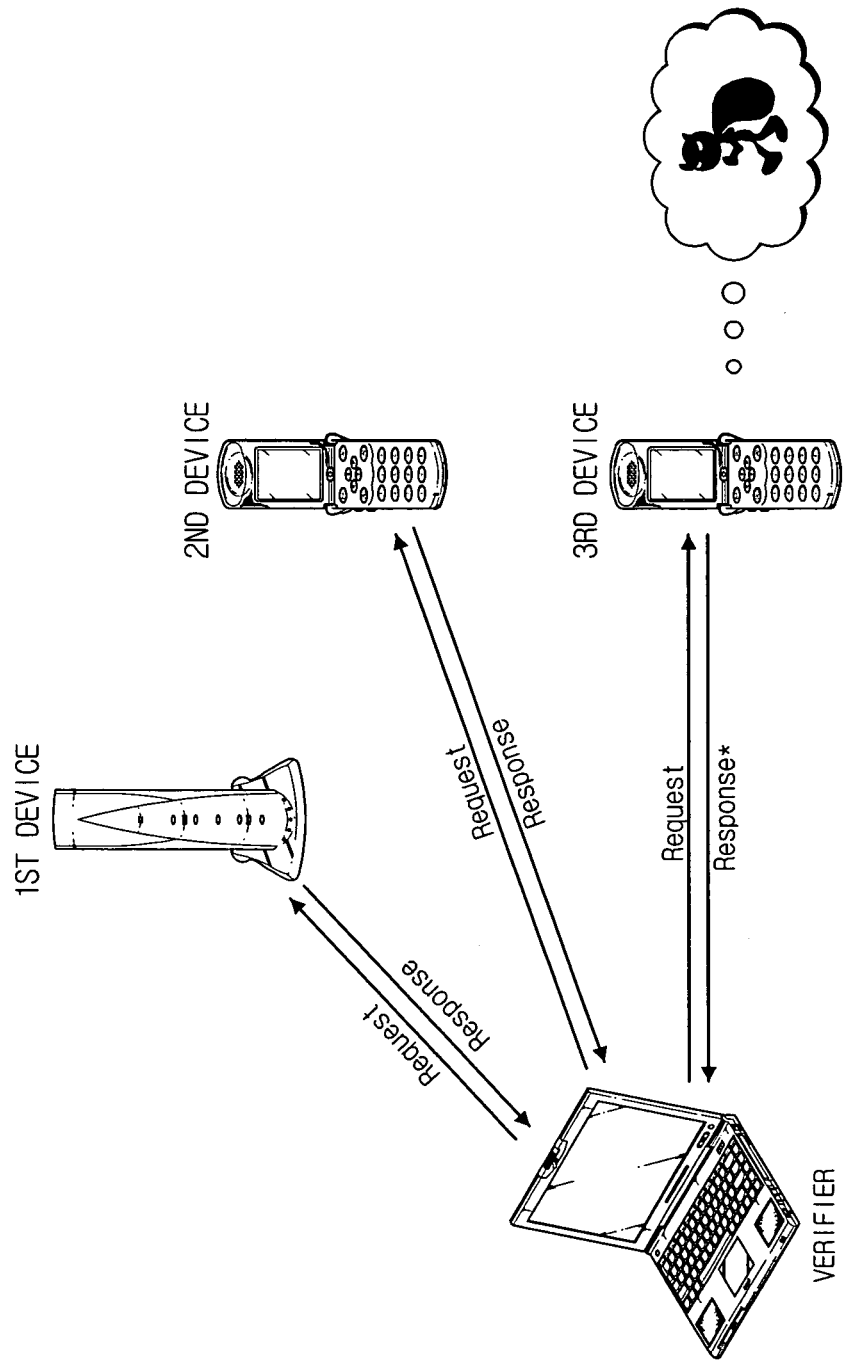
FIG. 1 illustrates a method of remote device integrity check known in the prior art.
Figure 2:
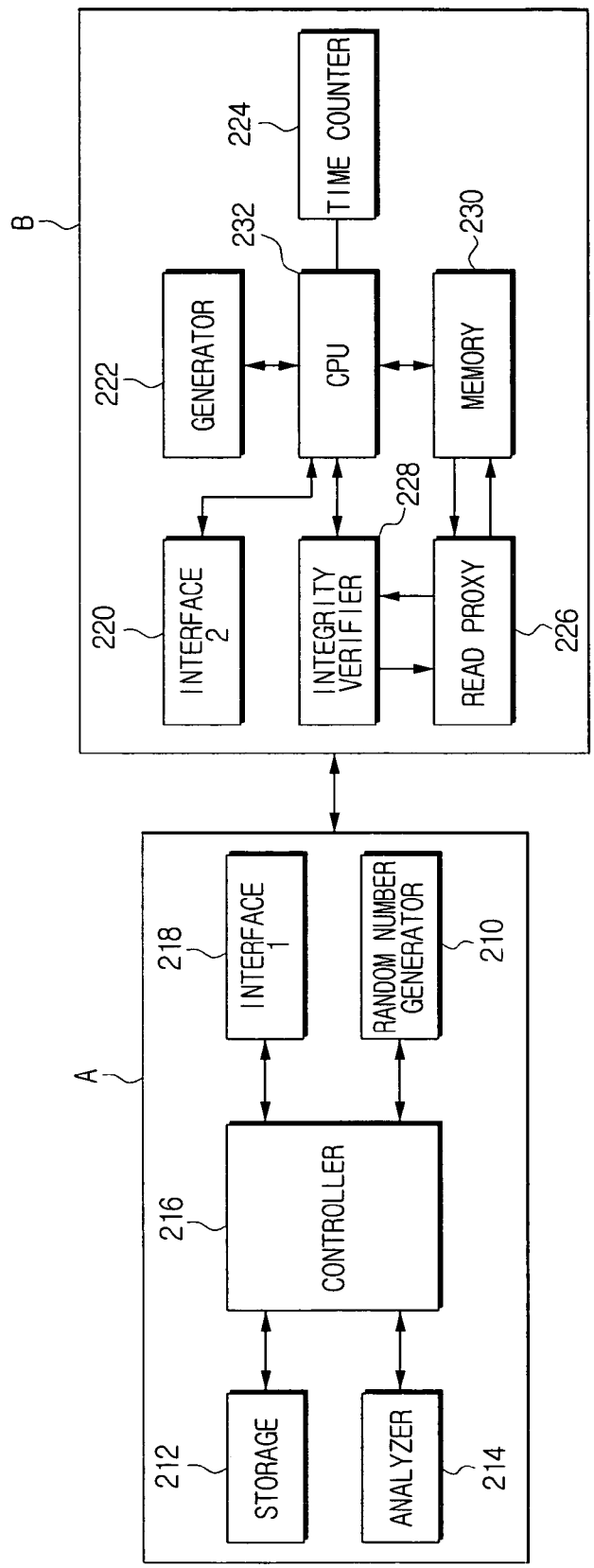
FIG. 2 is a schematic block diagram of a remote device memory integrity verification system according to an exemplary embodiment of the present invention.

FIG. 2 is a schematic block diagram of a remote device memory integrity verification system according to an exemplary embodiment of the present invention.

Referring to FIG. 2, a remote device memory integrity verification system according to an exemplary embodiment of the present invention includes a verifier A and a remote device B.

The verifier A includes a random number generator 210, a storage 212, an analyzer 214, a controller 216 and a first interface 218 ("interface 1").

The random number generator 210 generates a random number sequence, which is one of the verification parameters used to verify integrity of the remote device memory. The random number generator 210 uses a random number function to generate the random number sequence.

The storage 212 stores therein memory contents of the remote device to be verified, the random number function for use by the random number generator 210, a memory filling map which comprises information about the filling in of random numbers in empty areas of the remote device memory, and a message authentication code (MAC) generating function for use in the generation of local verification codes used to verify memory integrity.

The analyzer 214 generates a local verification code that is used to verify the integrity of the remote device, by using the MAC generating function stored in the storage 212. The analyzer 214 also compares a remote verification code received from the remote device B with the local verification code.

The controller 216 controls the device such that an integrity verifying function and a verification parameter are transmitted to the remote device B through the first interface 218.

The verification parameter refers to the random number sequence as generated by the random number generator 210, and the memory filling map stored in the storage 212. The integrity verifying function refers to a program which provides the remote device B with the random number sequence and the memory filling map, and receives a status value from the remote device B according to the result of the memory retrieval. The integrity verifying function is stored in the storage 212 as a program file, and transmitted to the remote device B through the first interface 218.

The controller 216 also receives through the first interface 218 the remote verification code and a data status value, and confirms the integrity of the device memory based on the received information. More specifically, the controller 216 determines whether the local verification code generated by the analyzer 214 matches the remote verification code received from the remote device B. If the local verification code matches the remote verification code, the integrity of the device memory is confirmed, while if not, the integrity is not confirmed.

The first interface 218 transmits and receives data with the remote device B. That is, the first interface 218 transmits the integrity verifying function and the verification parameter to use at the remote device B for remote verification code generation, and receives the remote verification code from the remote device B.

The remote device B includes a second interface 220 ("interface 2"), a generator 222, a time counter 224, a read proxy 226, an integrity verifier 228, a memory 230 and a CPU 232.

The second interface 220 transmits and receives data with the verifier A. That is, the second interface 220 transmits the remote verification code generated at the generator 222 to the first interface 218, and receives the integrity verifying function and the verification parameter from the first interface 218.

The generator 222 generates the remote verification code, using the memory filling map and the random number sequence received from the verifier A. That is, the generator 222 fills in the empty areas of the memory with the random numbers according to the memory filling map, and generates the remote verification code using the contents of the memory with no empty area and the MAC generating function. The MAC generating function is identical to the MAC generating function which is used in the generation of the local verification code at the verifier A.

The memory 230 may store first software received from the verifier A, second software which is received at the remote device B from a network host, and third software that is also stored at the verifier A. The memory 230 may also have empty area which does not store data therein. The first software may include the integrity verifying function. The integrity verifying function may exist as a program file in the memory 230, or may be stored in a buffer until the functions associated with the verification are complete.

The time counter 224 determines the times for retrieving a data block. That is, the time counter 224 determines a time t1 when the first data of the memory is retrieved for integrity verification by the read proxy 226 from the memory 230 and a time t2 when retrieval of the last data of the memory is completed.

The read proxy 226 computes a difference Δt between the time t1 of retrieving the first address from the memory 230 and the time t2 of completing the retrieval of the last address from the memory 230. If the computed difference Δt is larger than a threshold time allowed to read the memory, the status value of "Failed" is transmitted to the integrity verifier 228, and if not, the status value of "Success" is transmitted to the integrity verifier 228. The reading of the memory by the read proxy 226 includes filling in empty areas of the memory 230 with the random numbers according to the memory filling map, and reading in reverse order the contents of the filled memory.

The integrity verifier 228 is driven under the control of the CPU 232, and provides the read proxy 226 with the verification parameters for reading the memory 230, such as the memory filling map and random number sequence. The integrity verifier 228 also receives the status value from the read proxy 226 according to the result of the memory reading. The integrity verifier 228 provides the MAC generating function for the generation of the remote verification code. The MAC may be added to the data to verify whether the data is tampered with through processes such as data change, deletion, or insertion. The MAC function may include a hash function.

The CPU 232 controls the overall operation of the components of the remote device. Further, the CPU 232 controls the driving of the integrity verifier 228, and provides the generator 222 with the MAC function for use in the generation of the remote verification code. The CPU 232 also provides control such that the remote verification code generated at the generator 222, and the status values obtained at the read proxy 226 are transmitted to the verifier A through the second interface 220.

Figure 3:
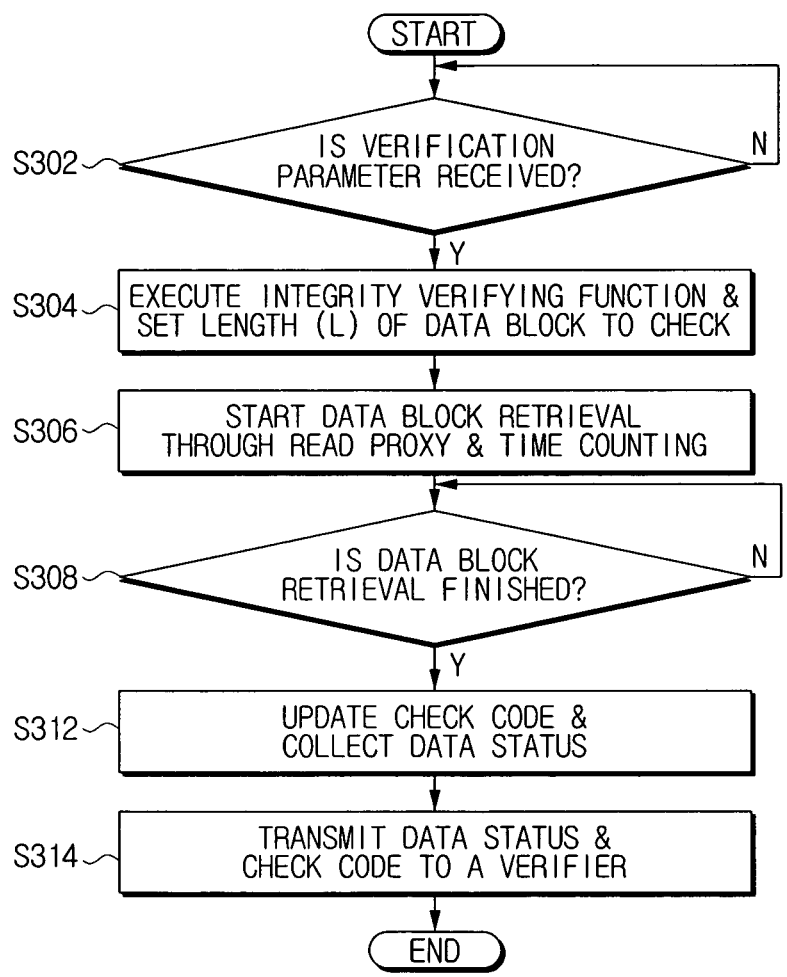
FIG. 3 is a flowchart illustrating a method of remote device memory integrity verification according to an exemplary embodiment of the present invention.

FIG. 3 is a flowchart illustrating a method of remote device memory integrity verification according to an exemplary embodiment of the present invention, which shows the operations of the remote device B for memory integrity verification.

First, in operation S302, the remote device B receives the verification parameter from the verifier A through the second interface 220. The remote device B also receives the integrity verifying function at this time. The verification parameter includes the random number sequence and the memory filling map.

Accordingly, in operation S304, the CPU 232 executes the integrity verifying function through the second interface 220 so that a length L of the data block to be verified with respect to the memory 230 is set. The length L may be represented in units of bytes.

The CPU 232 provides the read proxy 226 with the verification parameters for use in verifying the integrity of the memory 230, such as the memory filling map and the random number sequence. Additionally, the CPU 232 provides the generator 222 with the MAC generating function for the generation of the remote verification code through the integrity verifier 228. The generator 222 fills in the empty areas of the memory with the random numbers according to the memory filling map, and generates the remote verification code using the contents of the filled memory area, and the MAC generating function.

The read proxy 226 starts retrieval of the data block of the memory 230, and at this time, the CPU 232 starts counting the time by driving the time counter 224 (S306).

In operation S308, the read proxy 226 retrieves data from the first address of the memory 230 to the last address of the data block to be verified. The read proxy 226 computes a difference Δt between the time t1 of starting the data retrieval and the time t2 of finishing the retrieval of the last data of the memory 230 to be verified. The read proxy 226 compares the computed difference Δt with a threshold time, such that if it is larger than the threshold time, the status value of "Failed" is transmitted to the integrity verifier 228, and if not, the status value of "Success" is transmitted to the integrity verifier 228.

In operation S312, when the CPU 232 finishes retrieval of the data block from the memory 230 through the read proxy 226, the CPU 232 updates the verification codes, and collects through the integrity verifier 228 the status values based on the results of the retrieval. The verification codes comprise the local verification code, and the CPU 232 updates the local verification code, which is generated before the data block retrieval, with the local verification code generated after the completion of the data retrieval.

In operation S314, the CPU 232 transmits to the verifier A through the second interface 220, the status value obtained by completing data block retrieval and the newly updated remote verification code.

Accordingly, the verifier A receives the data status values and the remote verification code from the remote device B through the first interface 218, and confirms the integrity of the memory 230 through the analyzer 214 based on the received information. That is, the verifier A compares the local verification code with the remote verification code when the status value indicates "Success". If the local verification code is identical with the remote verification code as a result of the comparison, the verifier A perceives that the integrity verification is successful, while if not, perceives that the integrity verification is failed. The verifier A also perceives that the integrity verification is failed, if the status value indicates "Failed".

As explained above, because the remote device B directly fills in empty areas of the memory with random numbers and generates the MAC, an integrity verification can be accurately performed even with the location-shifting attacks of the malignant codes such as a virus.

Additionally, instead of relying on the verifier A, data status information is provided from the remote device B using the memory retrieval time. Therefore, integrity verification is accurate, and no separate hardware for integrity verification is necessary.

Furthermore, the memory integrity verification can be conducted not only during the booting of the remote device, but also during the driving of the remote device B.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A remote device, comprising:
   a memory;
   an interface for receiving a random number sequence, a memory filling map, and an integrity verifying function from a verifier;
   a controller for executing the integrity verifying function to determine a first address and a last address of a block of memory to be verified;
   a read proxy for retrieving data from the memory using the random number sequence and the memory filling map, and for generating a status value based on a difference between a time of retrieving data from the first address of the memory and a time of retrieving data from the last address of the memory; and
   a generator for filling in empty areas of the contents of the block of memory with the random number sequence according to the memory filling map such that the contents of the block of memory have no empty areas, and for generating a remote verification code based on the contents of the block of memory that have no empty areas,
   wherein the interface transmits the remote verification code and the status value to the verifier.

2. The remote device of claim 1, wherein the read proxy is further configured to read in reverse order the contents of the fully filled block of memory.

3. The remote device of claim 1, wherein the verifier provides the generator with a message authentication code (MAC) generating function, and the generator generates the remote verification code using the MAC generating function.

4. The remote device of claim 1, wherein the read proxy transmits the status value of "Failed" to the verifier when the time difference is larger than a threshold time allowed to read the memory, and transmits the status value of "Success" to the verifier when the time difference is not larger than the threshold time.

5. An apparatus for verifying integrity of a memory of a remote device, the apparatus comprising:
   a random number generator for generating a random number for use in verifying integrity of the memory of the remote device;
   a storage for storing a random number function for use by the random number generator, for storing a memory filling map which comprises information about the filling in of each empty area of a block of memory to be verified using the random number, for storing a message authentication code (MAC) generating function for use in generating a local verification code, and for storing an integrity verifying function that, upon execution, identifies a first address and a last address of the block of memory to be verified;
   an analyzer for generating a local verification code using the MAC generating function, and for comparing the generated local verification code with a remote verification code received from the remote device which is based on the contents of a block of memory of the remote device that has had the empty areas filled with random numbers according to the memory filling map such that the block of memory has no empty areas; and
   a controller for transmitting the random number, the memory filling map, and the integrity verification function to the remote device, for receiving the remote verification code and a data status value from the remote device, and for determining the integrity of the memory of the remote device based on the data status value and a comparison result between the local verification code and the remote verification code.

6. The apparatus of claim 5, wherein the data status value is a result of comparing a time difference with a threshold time, the time difference being obtained between a time of starting data retrieval of the memory and a time of finishing data retrieval of the memory, and wherein the data status value of "Failed" is received from the remote device when the time difference is larger than the threshold time, and the data status value of "Success" is received from the remote device when the time difference is not larger than the threshold time.

7. The apparatus of claim 6, wherein when the data status value is "Success", the local verification code is compared with the remote verification code, and if, as a result of the comparison, the local verification code is identical with the remote verification code, the integrity verification is determined to be successful, and if not, the integrity verification is determined to be failed, while, when the data status value is "Failed", the integrity verification is determined to be failed.

8. A method for verifying integrity of a remote device, the method comprising:
   receiving, from a verifier, a random number sequence, a memory filling map, and an integrity verification function;
   executing the integrity verifying function to determine a first address and a last address of a block of memory to be verified;
   retrieving data from the memory based on the random number sequence and the memory filling map;
   obtaining a data status value by comparing a time difference with a threshold time, the time difference being obtained as a result of comparing a time of retrieving data from the first address of the memory with a time of retrieving data from the last address of the memory;
   filling in empty areas of the contents of the block of memory with the random number sequence according to the memory filling map such that the contents of the block of memory have no empty areas; and
   generating a remote verification code based on the contents of the block of memory having no empty areas, and sending the remote verification code together with the data status value to the verifier.

9. The method of claim 8, wherein the filling in empty areas of the contents of the block of memory further comprises reading the contents of the full block of memory in a reverse order.

10. The method of claim 8, wherein the obtaining of the data status value by comparing the time difference with the threshold time, comprises setting the data status value to "Failed" when the time difference is larger than the threshold time, and setting the data status value to "Success" when the time difference is not larger than the threshold time.

11. The method of claim 8, wherein the generating of the remote verification code and sending it together with the data status value to the verifier comprises generating the remote verification code by using a message authentication code (MAC) generating function which is received from the verifier.

12. A remote device, comprising:
a memory;
a controller for executing an integrity verifying function to determine a first address and a last address of a block of memory to be verified;
a read proxy for retrieving data from the memory using a verification parameter and the first and last address generated by the integrity verifying function, and for generating a status value based on a difference between a time of retrieving data from the first address of the memory and a time of retrieving data from the last address of the memory;
a generator for filling in empty areas of the contents of the block of memory to be verified according to the verification parameter such that the contents of the block of memory have no empty areas, and for generating a remote verification code based on the contents of the block of memory that have no empty areas; and
an interface for transmitting the remote verification code and the status value to a verifier.

13. The remote device of claim 12, wherein the generator generates the remote verification code by using a memory filling map and a random number sequence which are received from the verifier.

14. The remote device of claim 13, wherein the read proxy retrieves the data by filling in empty areas of the memory with at least a subset of the random number sequence according to the memory filling map and reading in reverse order the contents of the filled memory.

15. A method for verifying integrity of a remote device, the method comprising:
providing, by a verifier, an integrity verification function and a verification parameter to a remote device;
executing the integrity verifying function to determine a block of memory to be verified;
retrieving data from a memory of the remote device based on the verification parameter and the block of memory;
determining a data status value by comparing a time of starting the data retrieval from the block of memory with a time of finishing the data retrieval from the block of memory;
filling in empty areas of the contents of the block of memory to be verified according to the verification parameter such that the contents of the block of memory have no empty areas;
generating a remote verification code based on the contents of memory that have no empty areas; and
transmitting the remote verification code and the data status value to the verifier.

16. The method of claim 15, wherein the verification parameter comprises a memory filling map and a random number sequence.

17. The method of claim 16, further comprising:
generating the remote verification code at the remote device by using a message authentication code (MAC) generating function which is received from the verifier; and
transmitting the remote verification code to the verifier.

18. The method of claim 17, further comprising:
generating a local verification code at the verifier by using the MAC generating function;
comparing the local verification code to the remote verification code;
determining, by the verifier, the integrity of the memory of the remote device based on the comparison of the local and remote verification codes and based on the data status value.

19. A remote device, comprising:
a memory;
an interface for receiving, from a verifier, an integrity verifying function and a memory filling map;
a controller for executing the integrity verifying function to determine a first address and a last address of a block of memory to be verified; and
a generator for filling in empty areas of the memory based on the memory filling map received from the verifier and the first address and the last address of the block of memory such that there are no empty areas in the contents from the first address and the last address of the block of memory, and for generating a remote verification code based on contents of the filled in memory that has no empty areas,
wherein the remote verification code is transmitted to the verifier using the interface.

* * * * *